Sept. 7, 1926.
W. MARSHALL
1,599,138
WEATHER STRIP ASSEMBLY
Filed August 25, 1924
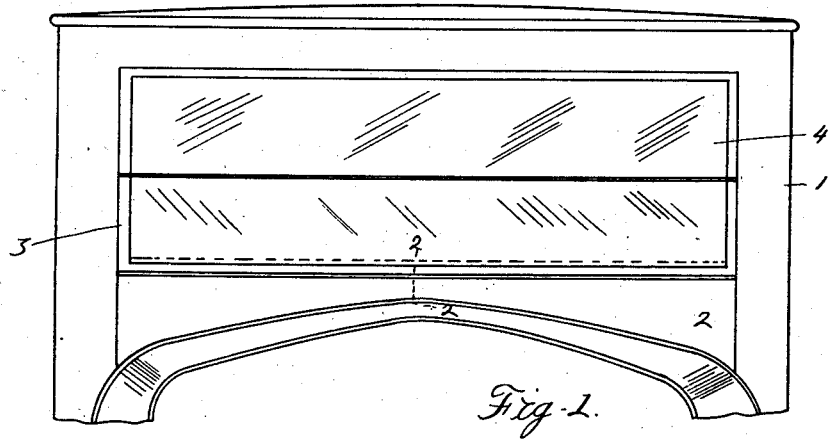
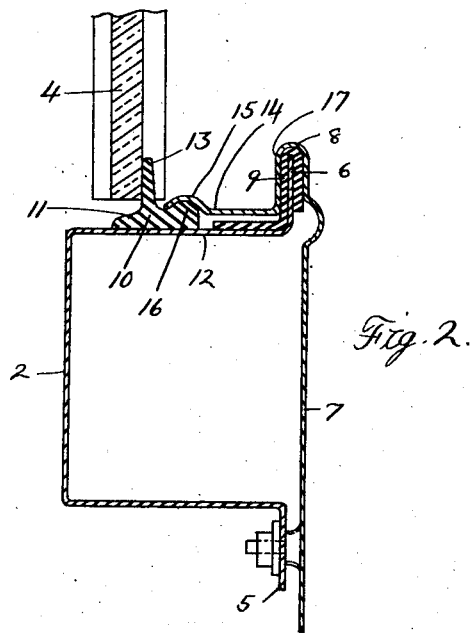
Inventor
William Marshall
Attorneys Patented Sept. 7, 1926.

1,599,138

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

WEATHER-STRIP ASSEMBLY.

Application filed August 25, 1924. Serial No. 734,126.

This invention relates generally to weather strips and refers more particularly to the means for attaching such strips to suitable supports such as the windshield frames of vehicle bodies.

One of the essential objects of the invention is to provide attaching means of this type that also serves as a finish strip or panel for the body of the vehicle.

Another object is to provide a strong and durable construction that can be manufactured at a comparatively low cost.

With the above and other objects in view the invention consists of certain novel features of construction, combinations and arrangements of parts as will be more fully described and particularly pointed out in the appended claims.

In the accompanying drawing;

Figure 1 is a front elevation of a vehicle body embodying my invention;

Figure 2 is a sectional view taken on line 2—2 of Figure 1.

Referring now to the drawing in which like characters of reference designate corresponding parts throughout the several views, the numeral 1 designates a vehicle body of the closed type having a rearwardly opening channel-shaped belt panel 2 that extends transversely of the vehicle body and forms the lower section or base of a vertical frame 3 in which a suitable windshield 4 is mounted. As shown, the channel of the panel is preferably provided at its inner edges with the vertical depending and upstanding flanges 5 and 6 respectively and is preferably closed by means of a belt finish panel 7 that is secured to the depending flange 5 and is provided with an open return-bent portion 8 that embraces the upstanding flange 6. To prevent rattling and at the same time to provide a yieldable cushion or bearing for the return-bent portion 8, a suitable strip 9 of felt or soft material is preferably placed over the upstanding flange 6 within the return-bent portion 8 as shown in Figure 2 of the drawing.

For preventing the passage of water, dust, etc. between the lower edge of the windshield 4 when closed and the belt panel 2, I preferably provide a suitable resilient weather strip 10 which has a base portion 11 that rests upon the upper side 12 of the channel of the panel 2 and is provided with a central longitudinally extending upstanding flange or web portion 13 that serves as an abutment for the windshield 4.

In order that the weather strip 10 may be held securely in position upon the belt panel 2, the return-bent portion 8 of the belt finish panel 7 is preferably provided at its lower edge with a laterally extending portion 14 that terminates in a transversely curved lip portion 15 which is adapted to extend over a bead 16 at the inner edge of the weather strip and have clamping engagement with the base 11 thereof. As shown, this bead preferably extends longitudinally of the base 11 of the weather strip adjacent to the upstanding flange 13 and the difference between the depth of the depending portion 17 of the return-bend, and the upstanding flange 6 is preferably such that when the belt finish panel 7 is secured to the depending flange 5, the return-bent portion 8 will be clamped firmly upon the felt 9 extending over the upstanding flange 6 and the lip 15 of the laterally extending portion 14 will be clamped firmly upon the base 11 of the weather strip between the bead 16 and the flange 13. Thus, the weather strip 10 is held securely in position by a portion of the panel 7 which forms a part of the exterior finish of the vehicle body.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a vehicle body, the combination with a substantially channel-shaped panel and a windshield mounted above said panel, of a weather strip on the panel engageable with the windshield, and means for securing the strip to said panel, said means including a panel closing the channel of the panel aforesaid and having a clamping portion engageable with said strip.

2. The combination with a channel-shaped support having depending and upstanding flanges respectively at the free edges thereof, of a weather strip having a base portion resting on one side of the channel-shaped portion and having an abutment flange, and means for securing the strip to the support including a panel secured to the depending flange and having a return-bent portion embracing the upstanding flange, and a laterally extending portion projecting from the return-bent portion engageable with the base of said strip.

3. The combination with a channel-shaped support having depending and upstanding flanges respectively at the free edges thereof, of a weather strip having a base portion resting on one side of the channel-shaped portion and having an abutment flange, means for securing the strip to the support including a panel secured to the depending flange and having a return-bent portion embracing the upstanding flange, a laterally extending portion projecting from the return-bent portion having a clamping lip engageable with the base of said strip, and a cushion for said return-bent portion on said upstanding flange.

4. The combination with a channel-shaped support having depending and upstanding flanges respectively at the free edges thereof, of a weather strip having a base portion resting on one side of the channel-shaped portion and having an abutment flange, the base of said strip also having a bead adjacent to the abutment flange, and means for securing the strip to the support including a panel secured to the depending flange and having a return-bent portion embracing the upstanding flange, and a laterally extending portion projecting from the return-bent portion having a clamping lip adapted to extend over the bead and engage the base of said strip between said flange and bead.

5. The combination with a panel having a flange, and a weather strip on the panel, of means for securing the strip to the panel including a finish strip secured to the flange having a lateral portion extending over the panel in spaced relation thereto and holding the strip against the said panel.

6. In a vehicle body, the combination with a belt panel having an upstanding flange at its inner edge, and a windshield adjustably mounted above said panel, of a weather strip having a substantially flat base resting on said panel and having an upstanding web constituting an abutment for said windshield, and securing means for said weather strip including a metal panel secured to said upstanding flange and having a lateral portion extending over the panel in spaced relation thereto and holding the base of said strip on said panel.

In testimony whereof I affix my signature.

WILLIAM MARSHALL.